United States Patent

Omure et al.

[11] Patent Number: 5,066,410
[45] Date of Patent: Nov. 19, 1991

[54] REFRIGERATING MACHINE COMPOSITION COMPRISING A FLUORINE-CONTAINING POLYETHER OIL

[75] Inventors: Yukio Omure, Takatsuki; Katsuki Fujiwara, Suita; Tatsumi Tsuchiya, Moriguchi; Satoshi Hishida, Takaishi; Masahiro Noguchi, Moriguchi; Ikuo Yamamoto, Osaka, all of Japan

[73] Assignee: Daikin Industries, Ltd., Osaka, Japan

[21] Appl. No.: 517,329

[22] Filed: May 1, 1990

[30] Foreign Application Priority Data

May 2, 1989 [JP] Japan .................................. 1-112987
Oct. 11, 1989 [JP] Japan .................................. 1-265609

[51] Int. Cl.$^5$ .............................................. C09K 5/00
[52] U.S. Cl. ........................................ 252/68; 252/54; 252/54.6
[58] Field of Search .................... 252/68, 54, 54.6; 568/593, 615

[56] References Cited

U.S. PATENT DOCUMENTS 3,564,059  2/1971  Sianesi et al. .................... 568/593
4,724,092  2/1988  Fukui et al. ........................ 252/54
4,836,944  6/1989  Tohzuka et al. ................... 252/54
4,845,268  7/1989  Ohsaka et al. ................... 568/615

Primary Examiner—Prince E. Willis
Assistant Examiner—Jerry D. Johnson
Attorney, Agent, or Firm—Larson and Taylor

[57] ABSTRACT

The present invention provides an oil for a refrigerating machine using a hydrogen-containing halogenated hydrocarbon as a refrigerant, the oil comprising a fluorine-containing polyether having repeated units represented by the formula

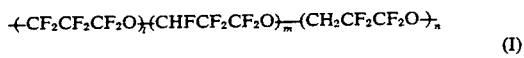 (I)

wherein l, m and n are all an integer of at least zero, the polyether being capable of satisfying the relationship represented by $$2 \leq l + m + n \leq 200$$

$$60 \leq \frac{m + 2l}{(l + m + n) \times 2} \times 100 \leq 95$$

3 Claims, No Drawings

REFRIGERATING MACHINE COMPOSITION COMPRISING A FLUORINE-CONTAINING POLYETHER OIL

FIELD OF THE INVENTION

The present invention relates to a refrigerating machine oil. The refrigerating machines referred to herein include heat pumps.

BACKGROUND OF THE INVENTION

Heretofore known as refrigerating machine oils are mineral oils such as paraffin oils, naphthene oils and the like, and synthetic oils such as alkylbenzene oils, ester oils and the like. These oils are used chiefly for refrigerating machines using trichlorofluoromethane (R-11), dichlorodifluoromethane (R-12) or the like as the refrigerant. In recent years, however, it has been suggested that chlorine-containing fully halogenated hydrocarbons such as R-11 or R-12 released into the atmosphere would deplete the stratospheric ozone layer, thereby inflicting a serious adverse influence on the ecosystem including humans on the earth. Consequently a worldwide agreement, "The Montreal Protocol" signed in September 1987, calls for the restriction of consumption and production of the major ozone-depleting flons such as R-11 and R-12.

Use of $CH_2FCF_3$ (R-134a) or like hydrogen-containing fluorinated hydrocarbons has been proposed as a substitute for R-11 or R-12. The proposed hydrocarbons are unlikely to deplete the ozone layer but very low in compatibility with conventional refrigerator oils. Because of this defect, the hydrogen-containing fluorinated hydrocarbon used as a refrigerant in a refrigerator together with a conventional refrigerator oil significantly reduces the refrigerating capacity and coefficient of performance.

SUMMARY OF THE INVENTION

According to the present invention, there is provided an oil for a refrigerating machine using a hydrogen-containing halogenated hydrocarbon as a refrigerant, the oil comprising a fluorine-containing polyether having repeated structural units represented by the formula (I)

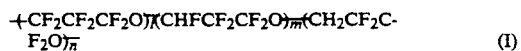
(I)

wherein l, m and n are all an integer of at least zero, the polyether being capable of satisfying the relationship represented by $$2 \leq l + m + n \leq 200$$

$$60 \leq \frac{m + 2l}{(l + m + n) \times 2} \times 100 \leq 95$$

MEANS FOR SOLUTION OF PROBLEMS

We conducted extensive research to overcome the foregoing prior art problems and found that when a specific fluorine-containing oil is used in a refrigerating machine using a hydrogen-containing halogenated hydrocarbon as a refrigerant, the machine is operated without reducing the refrigerating capacity and the coefficient of performance as compared with conventional refrigerators employing R-12 (refrigerant) and a known mineral-type refrigerator oil in combination.

DETAILED DESCRIPTION OF THE INVENTION

The refrigerating machine oil of the invention is composed essentially of a fluorine-containing polyether having repeated units represented by the formula (I)

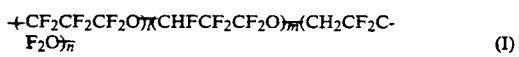
(I)

wherein l, m and n are all an integer of at least zero, the polyether being capable of satisfying the relationship represented by $$2 \leq l + m + n \leq 200$$

$$60 \leq \frac{m + 2l}{(l + m + n) \times 2} \times 100 \leq 95$$

Such fluorine-containing polyethers are excellent in compatibility with hydrogen-containing halogenated hydrocarbons as a refrigerant over a wide temperature range. These polyethers used as a refrigerating machine oil enable the refrigerating machine to operate for an extended period of time due to their excellent resistance to abrasion. With a high volume resistivity and a low dielectric constant, the polyethers can exhibit a high electrical insulating characteristic and are useful for preventing leak of electricity.

Among the fluorine-containing polyethers having the repeated units of the formula (I), preferred are those containing groups as substituents at one or both of terminals selected from the group $-CH_2OH$, group

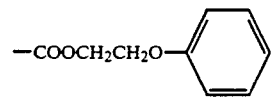

and group $-CF_2CF_3$.

Among the fluorine-containing polyethers having the repeated units of the formula (I), those capable of satisfying the relationship expressed by $$80 \leq \frac{m + 2l}{(l + m + n) \times 2} \times 100 \leq 90$$

are excellent in abrasion resistance, hence more desirable.

The refrigerating machine oil of the present invention may be used in combination with a conventional refrigerating machine oil which would not adversely affect the properties of the oil of the invention. Use of such conventional oil can reduce the costs and facilitates wetting of the machine element. The oil of the invention as mixed with the conventional oil at a suitable ratio can be emulsified unexpectedly despite the incompatibility of the two oils with each other and can form a highly stable uniform layer over a wide temperature range. Such mixture used with the refrigerant specified in the invention can function as contemplated with the refrigerator oil. Examples of conventional oils for use herein are mineral oils (paraffin oils, naphthene oils, etc.), oils of alkyl benzene, polybutene, α-olefin oligomer, polyalkylene glycol, diester, polyol ester, ester sulfate, ester silicate, silicone, polyphenyl ether or the like.

There is no specific limitation on the hydrogen-containing halogenated hydrocarbons usable as a refrigerant in this invention. Such hydrocarbons include hydrogen-containing fluorinated hydrocarbons, hydrogen-containing chlorinated fluorinated hydrocarbons, etc. These hydrocarbons are usable singly or at least two of them can be used in mixture.

The hydrogen-containing fluorinated hydrocarbons (hereinafter referred to as "HFC") are not specifically limited. The abbreviation HFC used herein refers to chlorine-free hydrogen-containing fluorinated hydrocarbons. Examples of such hydrocarbons are: $CHF_3$ (HFC 23), $CH_2F_2$ (HFC 32), $CH_3F$ (HFC 41), $CHF_2CF_3$ (HFC 125), $CHF_2CHF_2$ (HFC 134), $CF_3CH_2F$ (HFC 134a), $CHF_2CH_2F$ (HFC 143), $CF_3CH_3$ (HFC 143a), $CH_2FCH_2F$ (HFC 152), $CHF_2CH_3$ (HFC 152a), $CH_2FCH_3$ (HFC 161), $CHF_2CF_2CF_3$ (HFC 227ca), $CH_2FCF_2CF_3$ (HFC 236cb), $CH_3CF_2CF_3$ (HFC 245cb), $CH_3CF_2CHF_2$ (HFC 254cb), $CH_3CH_2CF_3$ (HFC 236fb), etc. Among them, preferable are HFC 125, HFC 134a, HFC 143a, HFC 152a and the like. HFC's are usable singly or at least two of them can be used in mixture.

The hydrogen-containing chlorinated fluorinated hydrocarbons (hereinafter referred to as "HCFC") usable with the oil of the invention are not specifically limited. Examples of such hydrocarbons are $CHClF_2$ (HCFC 22), $CHCl_2CF_3$ (HCFC 123), $CHClFCClF_2$ (HCFC 123a), $CHF_2CCl_2F$ (HCFC 123b), $CHClFCF_3$ (HCFC 124), $CHF_2CClF_2$ (HCFC 124a), $CHClFCHF_2$ (HCFC 133), $CH_2ClCF_3$ (HCFC 133a), $CClF_2CH_2F$ (HCFC 133b), $CHCl_2CH_2F$ (HCFC 141a), $CCl_2FCH_3$ (HCFC 141b), $CHF_2CH_2Cl$ (HCFC 142), $CHClFCH_2F$ (HCFC 142a), $CClF_2CH_3$ (HCFC 142b), $CHClFCF_2CF_3$ (HCFC 226ca), $CH_2ClCF_2CF_3$ (HCFC 235cb), $CH_3CF_2CClF_2$ (HCFC 244cc), $CH_3CHClCF_3$ (HCFC 253db), $CH_3CH_2CClF_2$ (HCFC 262fc), etc. Among them, desirable are HCFC 22, HCFC 123, HCFC 141b, HCFC 142b, HCFC 235cb, etc. HCFC's are usable singly or at least two of them can be used in mixture.

The mixing ratio of HFC and HCFC is not specifically limited. Usually selected is a mixing ratio at which the refrigerator can exhibit the highest refrigerating capacity.

ADVANTAGES OF THE INVENTION

The refrigerating machine oils of the invention are outstanding in compatibility with the hydrogen-containing halogenated hydrocarbon over a wide temperature range and suitable for use in a refrigerating machine using a hydrogen-containing halogenated hydrocarbon as a refrigerant. The refrigerator charged with a combination of a hydrogen-containing halogenated hydrocarbon (refrigerant) and the refrigerator oil of the invention can exhibit a refrigerating capacity and a coefficient of performance as high as or higher than conventional techniques employing a combination of R-12 (refrigerant) and a mineral-type refrigerator oil.

The refrigerator oils of the invention have an excellent resistance to abrasion and thus render the refrigerator serviceable for an extended life time.

EXAMPLE

The present invention will be described below in more detail with reference to the following Examples and Comparison Examples.

EXAMPLES 1 TO 10 AND COMPARISON EXAMPLES 1 TO 3

A refrigerating machine was operated for 2,856 hours under the conditions as shown below in Table 1 using the refrigerants and the refrigerating machine oils as indicated below in Table 2. Table 2 also shows the refrigerating capacity (kcal/hr), ratio of refrigerating capacity, and coefficient of performance (COP).

TABLE 1

| Cond. No. | Inlet of Evaporator | | Inlet of Condenser | |
|---|---|---|---|---|
| | Amount (l/min) | Temperature (°C.) | Amount (l/min) | Temperature (°C.) |
| (1) | 15.2 | 12.1 | 5.6 | 30.0 |
| (2) | 20.2 | 11.7 | 7.8 | 30.1 |

(Note)
The amount and temperature in Table 1 are those of water.
The temperature at the outlet of the evaporator is 8° C.
The temperature at the outlet of the condenser is 6° C.

In examples 2 and 7, the ratio of the two refrigerants in the HFC 134a/HFC 143a mixture was 90/10 (% by weight).

In Examples 3 and 8, the ratio of the two refrigerants in the HFC 134a/HCFC 124 mixture was 90/10 (% by weight).

Symbols A to D in Tables 2 to 7 represent the following refrigerating machine oils. Among them, A to C designate the refrigerating machine oils of the invention, and D, a conventional refrigerator oil for comparison.

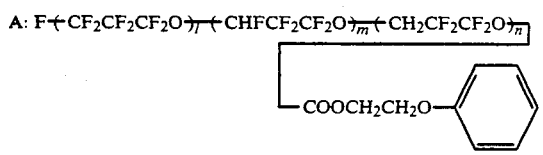

(wherein l=15, m=14, n=1), fluorination percentage 74%.

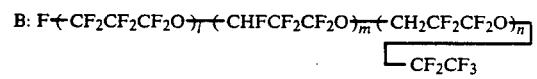

(wherein l=15, m=14, n=1), fluorination percentage 74%.

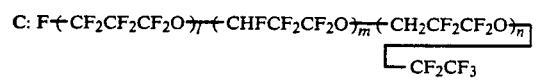

(wherein l=17, m=5, n=0), fluorination percentage 88%. D: Refrigerating machine oil: Naphthene-type mineral oil (trade name "Suniso 4GS", product of Nihon Sun Petroleum Co., Ltd.)

TABLE 2

| | Refrigerant | Refrigerator oil | Cond. | Refrigerating capacity(Kcal/hr) | Refrigerating capacity ratio | COP | COP ratio |
|---|---|---|---|---|---|---|---|
| Comp. Ex. 1 | HFC134a | A | (1) | 4580 | 1.00 | 2.10 | 1.02 |

TABLE 2-continued

|   | Refrigerant | Refrigerator oil | Cond. | Refrigerating capacity(Kcal/hr) | Refrigerating capacity ratio | COP | COP ratio |
|---|---|---|---|---|---|---|---|
|   |   |   | (2) | 4960 | " | 2.42 | " |
| Ex. |   |   |   |   |   |   |   |
| 1 | HFC134a | A | (1) | 4660 | 1.02 | 2.20 | 1.07 |
| 2 | HFC134a/HFC143a | A | (1) | 4810 | 1.05 | 2.12 | 1.03 |
| 3 | HFC134a/HCFC124 | A | (1) | 4670 | 1.02 | 2.14 | 1.04 |
| 4 | HFC125 | A | (1) | 4980 | 1.09 | 2.12 | 1.03 |
| 5 | HFC32 | A | (1) | 5020 | 1.10 | 2.11 | 1.02 |
| 6 | HFC134a | B | (1) | 4640 | 1.02 | 2.18 | 1.06 |
| 7 | HFC134a/HFC143a | B | (1) | 4800 | 1.40 | 2.11 | 1.02 |
| 8 | HFC134a/HCFC124 | B | (1) | 4650 | 1.02 | 2.14 | 1.04 |
| 9 | HFC125 | B | (1) | 4970 | 1.10 | 2.11 | 1.02 |
| 10 | HFC32 | B | (1) | 5000 | 1.10 | 2.11 | 1.02 |
| Comp. Ex. |   |   |   |   |   |   |   |
| 2 | CFC12 | D | (1) | 4560 | 1.00 | 2.06 | 1.00 |
|   |   |   | (2) | 4960 | " | 2.41 | " |
| 3 | HFC134a | D | (1) | 3560 | 0.78 | 1.91 | 0.91 |
|   |   |   | (2) | 3860 | " | 2.14 | " |

Table 2 shows that the combination of the refrigerant (hydrogen-containing halogenated hydrocarbon) and the refrigerator oil (the fluorine-containing oil of the formula (I)) according to the invention produces a refrigerating effect as high as or higher than the combination of the conventional refrigerant (R-11 or -12) and the conventional refrigerator oil (mineral oil or synthetic oil).

EXAMPLE 11

A refrigerating machine was operated for 2,856 hours under the conditions (1) in Table 1 employing the refrigerant mixture and the refrigerator oil indicated below in Table 3. Table 3 also shows the refrigerating capacity (kcal/hr), refrigerating capacity ratio, coefficient of performance (COP), and coefficient of performance ratio. The former to latter ratio of two refrigerants in the refrigerant mixture are 90/10 (% by weight).

TABLE 3

| Refrigerant mixture | Refrigerator oil | Refrigerating capacity(kcal/hr) | Refrigerating capacity ratio | COP | COP ratio |
|---|---|---|---|---|---|
| HFC125/HFC32 | A | 5000 | 1.10 | 2.12 | 1.03 |
|   | B | 4980 | 1.09 | 2.12 | 1.03 |
| HFC134a/HFC32 | A | 4800 | 1.05 | 2.13 | 1.03 |
|   | B | 4800 | 1.05 | 2.12 | 1.03 |
| HFC143a/HFC32 | A | 4980 | 1.09 | 2.12 | 1.03 |
|   | B | 4900 | 1.07 | 2.12 | 1.03 |
| HFC125/HFC134a | A | 4810 | 1.05 | 2.13 | 1.03 |
|   | B | 4730 | 1.04 | 2.13 | 1.03 |
| HFC125/HFC143a | A | 4990 | 1.09 | 2.11 | 1.02 |
|   | B | 4940 | 1.08 | 2.11 | 1.02 |
| HFC134a/HFC143a | A | 4810 | 1.05 | 2.12 | 1.03 |
|   | B | 4800 | 1.05 | 2.11 | 1.02 |

EXAMPLES 12 TO 15 AND COMPARISON EXAMPLES 4

A 0.3 to 0.5 quantity of the refrigerating machine oil and 1.2 to 2.0 g of the refrigerant as shown in Table 2 were charged into and sealed in a pressure-proof glass tube under a vacuum at an oil/refrigerant weight ration of 1:4. The contents of the tube were cooled or heated and the temperature range over which the oil and the refrigerant remained compatible with each other was determined by visual inspection. Table 4 shows the results.

TABLE 4

|   | Refrigerant | Refrigerator oil | Temp. range for compatibility | |
|---|---|---|---|---|
|   |   |   | low temp. range | high temp. range |
| Ex. |   |   |   |   |
| 12 | HFC 134a | A | −30 | 100 ↑ |
| 13 | HFC 125 | A | −60 ↓ | 65 ↑ |
| 14 | HFC 134a | B | −20 to 22 | 95 to 98 |
| 15 | HFC 125 | B | −60 ↓ | 65 ↑ |
| Comp. Ex. 4 | HFC 134a | D | Incompatible | |

Note:
The mark " ↑ " shows that the oil and refrigerant remained compatible with each other until the critical temperature of the refrigerant was reached.
The mark " ↓ " shows that the oil and the refrigerant remained compatible with each other until the pour point of the oil was reached.

Table 4 reveals that the refrigerating machine oils of the invention are excellent in compatibility with hydrogen-containing halogenated hydrocarbons as a refrigerant over a wide temperature range.

EXAMPLES 16 AND 17 AND COMPARISON EXAMPLE 5

The volume resistivity value ($\Omega$cm) and the specific dielectric constant of the refrigerating machine oil of the invention were measured according to JIS C2101-1982. Table 5 below shows the results.

TABLE 5

| Example | Refrigerator oil | Volume resistivity (Ωcm) | Dielectric constant |
|---|---|---|---|
| 16 | A | $3.50 \times 10^{12}$ | 3.31 |
| 17 | B | $1.00 \times 10^{13}$ | 1.72 |
| Comp. Ex. 5 | PAG | $9.0 \times 10^{10}$ | 5.06 |

Note: PAG stands for polyalkylene glycol

Table 5 shows that the refrigerating machine oils of the invention have a high volume resistivity and a low dielectric constant, and are excellent in electrical insulating property and useful for preventing leak of electricity.

EXAMPLES 18 AND 19 AND COMPARISON EXAMPLES 6 AND 7

The refrigerating machine oils of the invention were subjected to Falex test according to ASTM D-3233 to determine the critical load value for seizing (Lbs). Table 6 shows the results.

TABLE 6

| | Refrigerator oil | Critical load value for seizing (Lbs) |
|---|---|---|
| Ex. | | |
| 18 | A | 3000 or more |
| 19 | B | 2900 |
| Comp. Ex. | | |
| 6 | D | 500 |
| 7 | PAG | 900–1000 |

Table 6 indicates that the refrigerating machine oils of the invention have a high lubricity.

EXAMPLE 20 AND COMPARISON EXAMPLES 8 AND 9

The abrasion loss was determined by conducting Falex test according to ASTM D-3233-73. Stated more specifically, HFC134a was blown in under a load of 600 Lbs, and the weight loss of the block and pin caused during a 10-minute period was determined. Table 7 below shows the results.

TABLE 7

| | Refrigerator oil | Weight loss (mg) Block | Weight loss (mg) Pin |
|---|---|---|---|
| Ex. 20 | C | 1.0 | 3.3 |
| Comp. Ex. | | | |
| 8 | D | (pin broke in 30 sec.) | |
| 9 | PAG | 2.6 | 10.0 |

Table 7 indicates that because of their high abrasion resistance, the refrigerating machine oils of the invention used for a refrigerating machine improve the durability of the machine.

We claim:

1. A refrigerating machine composition comprising a hydrogen-containing halogenated hydrocarbon as a refrigerant and a machine oil, wherein the machine oil comprises a fluorine-containing polyether having repeated structure units represented by the formula (I)

$$\text{+CF}_2\text{CF}_2\text{CF}_2\text{O}\text{)}_l\text{(CHFCF}_2\text{CF}_2\text{O)}_m\text{(CH}_2\text{CF}_2\text{CF}_2\text{O)}_n \quad (I)$$

wherein l, m and n are all an integer of at least zero, and satisfying the relationship represented by $$2 \leq l + m + n \leq 200$$

$$60 \leq \frac{m + 2l}{(l + m + n) \times 2} \times 100 \leq 95$$

2. A refrigerating machine composition according to claim 1 wherein the fluorine-containing polyether having the repeated units of the formula (I) contains at least one terminal group substituent selected from the group consisting of —CH$_2$OH,

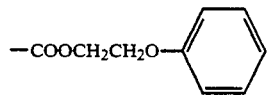

and —CF$_2$CF$_3$.

3. A refrigerating machine composition according to claim 1 wherein the fluorine-containing polyether having the repeated units of the formula (I) satisfies the relationship expressed by $$80 \leq \frac{m + 2l}{(l + m + n) \times 2} \times 100 \leq 90$$

* * * * *